United States Patent
Aoki (10) Patent No.: US 7,743,759 B2
(45) Date of Patent: Jun. 29, 2010

(54) GAS SENSOR CONTROLLER

(75) Inventor: Keiichiro Aoki, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 212 days.

(21) Appl. No.: 12/024,529

(22) Filed: Feb. 1, 2008

(65) Prior Publication Data

US 2008/0184774 A1 Aug. 7, 2008

(30) Foreign Application Priority Data

Feb. 7, 2007 (JP) ............................. 2007-028575

(51) Int. Cl.
*F02D 41/00* (2006.01)
*F01N 9/00* (2006.01)

(52) U.S. Cl. .................... 123/672; 701/109; 60/276

(58) Field of Classification Search ......... 123/672–674, 123/693, 694, 697; 701/109; 60/274, 276; 204/424–426
See application file for complete search history.

(56) References Cited

U.S. PATENT DOCUMENTS

| | | | | | |
|---|---|---|---|---|---|
| 4,532,013 | A | * | 7/1985 | Dietz et al. | 205/784 |
| 4,724,815 | A | * | 2/1988 | Mieno et al. | 123/690 |
| 4,873,642 | A | * | 10/1989 | Mieno et al. | 701/109 |
| 5,245,979 | A | * | 9/1993 | Pursifull et al. | 123/690 |
| 6,453,724 | B1 | * | 9/2002 | Kawase et al. | 73/23.31 |
| 6,554,984 | B2 | * | 4/2003 | Inoue et al. | 204/425 |
| 6,635,162 | B2 | * | 10/2003 | Sugaya et al. | 204/426 |
| 6,849,174 | B2 | * | 2/2005 | Hada et al. | 205/781 |
| 7,047,728 | B2 | * | 5/2006 | Yasui | 60/285 |
| 7,286,926 | B2 | * | 10/2007 | Gotoh et al. | 701/114 |
| 7,490,596 | B2 | * | 2/2009 | Yasui et al. | 123/697 |
| 2002/0017285 | A1 | * | 2/2002 | Okamoto | 123/685 |
| 2002/0043257 | A1 | * | 4/2002 | Kato et al. | 123/688 |
| 2002/0078938 | A1 | * | 6/2002 | Hada et al. | 123/697 |
| 2003/0019486 | A1 | * | 6/2003 | Hada et al. | 123/697 |
| 2003/0178016 | A1 | * | 9/2003 | Nebiyeloul-Kifle et al. | 123/676 |
| 2003/0187568 | A1 | * | 10/2003 | Yasui et al. | 701/109 |
| 2005/0000504 | A1 | * | 1/2005 | Ohkuma | 123/680 |

FOREIGN PATENT DOCUMENTS

| | | |
|---|---|---|
| DE | 100 15 282 A1 | 11/2000 |
| DE | 100 31 474 A1 | 4/2001 |

(Continued)

*Primary Examiner*—Stephen K Cronin
*Assistant Examiner*—Johnny H Hoang
(74) *Attorney, Agent, or Firm*—Oblon, Spivak, McClelland, Maier & Neustadt, L.L.P.

(57) ABSTRACT

An ECU controls an A/F sensor that is provided in an exhaust system of an internal combustion engine and produces current outputs corresponding to the concentration of oxygen in exhaust gas by being supplied with voltage and produces voltage outputs corresponding to the concentration of oxygen in exhaust gas according to the difference between the oxygen concentration around one of a pair of electrodes of the A/F sensor and the oxygen concentration around the other electrode. The ECU has: an energization limitation portion that, when moisture content is adhering on an inner face of an exhaust passage near the A/F sensor, energizes a heater of the A/F sensor while limiting the amount of power supplied thereto; and a specific output obtaining portion that obtains voltage outputs from the A/F sensor at least when the energization limitation portion is energizing the heater while limiting the amount of power supplied thereto.

7 Claims, 5 Drawing Sheets

FOREIGN PATENT DOCUMENTS

| | | |
|---|---|---|
| DE | 103 21 926 A1 | 12/2003 |
| JP | 1-169349 | 7/1989 |
| JP | 3-56849 | 3/1991 |
| JP | 2001-13107 | 1/2001 |
| JP | 2001-41923 | 2/2001 |
| JP | 2001-74693 | 3/2001 |
| JP | 2003-83152 | 3/2003 |
| JP | 2006-220573 | 8/2006 |

* cited by examiner

GAS SENSOR CONTROLLER

INCORPORATION BY REFERENCE

The disclosure of Japanese Patent Application No. 2007-028575 filed on Feb. 7, 2007 including the specification, drawings and abstract is incorporated herein by reference in its entirety.

BACKGROUND OF THE INVENTION

1. Field of the Invention

The invention relates to a gas sensor controller, and particularly to a gas sensor controller for obtaining current outputs and voltage outputs from a gas sensor provided with a heater.

2. Description of the Related Art

In general, the exhaust system of an internal combustion engine incorporates various gas sensors including an air-fuel ratio sensor (will hereinafter be referred to as "A/F sensor"). Such gas sensors are normally provided with a heater that is used to heat and thus activate the sensor element of the gas sensor promptly so that the gas sensor becomes able to produce outputs as intended as soon as possible. However, if the heated sensor element is moistened by condensed water, or the like, the temperature of the moistened portion of the sensor element sharply drops, which may cause cracking of the sensor element. Thus, various technologies for preventing such cracking of sensor elements due to moistening have been proposed (Refer to Japanese patent application publications No. 2003-83152 (JP-A-2003-83152) and No. 2001-41923 (JP-A-2001-41923). Japanese patent application publication No. 2003-83152 recites energizing the heater of the gas sensor such that the temperature of the heater is maintained lower than normal when it has been determined that moisture content is adhering on the inner face of the exhaust passage. That is, this technology is aimed at preventing cracking of the sensor element due to moistening.

Generally, in order to ensure that an A/F sensor produces accurate current outputs corresponding to the oxygen concentration in exhaust gas, the temperature of the sensor element of the A/F sensor needs to be maintained at approximately 750° C. Meanwhile, in order to determine at least whether the air-fuel ratio of exhaust gas is fuel-rich or fuel-lean based on the current outputs of an A/F sensor, the temperature of the sensor element of the A/F sensor needs to be maintained at approximately 500 to 600° C. at lowest. Therefore, in order to execute an air-fuel ratio control properly using the current outputs of an A/F sensor, the temperature of the sensor element of the A/F sensor needs to be maintained at approximately 500 to 600° C. at lowest.

Meanwhile, cracking of the sensor element of an A/F sensor can be prevented by maintaining the temperature of the sensor element at a level at and below which cracking of the sensor element does not occur (e.g., 300° C.) by limiting the amount of power supplied to the heater. In this case, however, although cracking of the sensor element can be prevented, the current outputs of the A/F sensor can not be used for the air-fuel ratio control, that is, it is impossible to enable early reduction of exhaust emissions. On the contrary, when the temperature of the sensor element of the A/F sensor is maintained at approximately 500 to 600° C. by controlling the energization of the heater, the temperature of the sensor element largely exceeds the level at and below which cracking of the sensor element does not occur even though the air-fuel ratio control can be executed at an early stage to reduce exhaust emissions. That is, if the heater is energized so as to enable early reduction of exhaust emissions, it inevitably creates a state where cracking of the sensor element due to moistening may occur.

SUMMARY OF THE INVENTION

The invention has been made to provide a gas sensor controller that enables early reduction of exhaust emissions by realizing early execution of the air-fuel ratio control while preventing cracking of the sensor element of a gas sensor due to moistening.

In order to achieve this object, an aspect of the invention relates to a gas sensor controller for controlling a gas sensor that is provided in an exhaust system of an internal combustion engine and produces current outputs corresponding to the concentration of a detection target substance in exhaust gas by being supplied with voltage and produces voltage outputs corresponding to the concentration of a detection target substance in exhaust gas according to the difference between the concentration of the detection target substance around one of a pair of electrodes of the gas sensor and the concentration of the detection target substance around the other of the electrodes. The gas sensor controller includes: an energization limitation portion that, when moisture content is adhering on an inner face of an exhaust passage in the exhaust system, energizes a heater of the gas sensor while limiting the amount of power supplied to the heater; and a specific output obtaining portion that obtains voltage outputs from the gas sensor at least when the energization limitation portion is energizing the heater while limiting the amount of power supplied to the heater.

In order to make the gas sensor serve as an A/F sensor and produce current outputs suitable for the use in the air-fuel ratio control, the temperature of the sensor element of the gas sensor needs to be maintained at 500 to 600° C. at lowest as mentioned earlier. Meanwhile, in order to make the gas sensor serve as an oxygen sensor and produce voltage outputs suitable for the use in the air-fuel ratio control, it is sufficient to maintain the temperature of the sensor element at 300° C. or so. In view of this, when moisture content is adhering on the inner face of the exhaust passage, the above-described gas sensor controller limits the energization of the heater such that the temperature of the sensor element is suppressed to a level at and below which cracking of the sensor element due to moistening does not occur. Then, the gas sensor controller obtains the voltage outputs from the gas sensor and executes the air-fuel ratio control using the obtained voltage outputs. As such, the air-fuel ratio control can be executed at an early stage and therefore exhaust emissions can be reduced promptly.

The "exhaust passage" recited above includes, for example, an exhaust passage in an exhaust port and an exhaust passage in an exhaust pipe near the gas sensor. Further, the "exhaust passage" is not necessarily located at one position, but it may include both the exhaust passage in an exhaust port and the exhaust passage in an exhaust pipe near the gas sensor, for example. This is because the heat capacity of the cylinder head in which the exhaust ports are formed is larger than that of each exhaust pipe forming an exhaust passage and the cylinder head is cooled by the coolant.

More specifically, in some internal combustion engines, it may be the case that, after cold engine start, the temperature of the inner face of each exhaust port has not yet reached the dew point even though the temperature of the inner face of an exhaust pipe has exceeded the dew point. In this case, condensed water continues to be produced at each exhaust port even after the temperature of the inner face of the exhaust pipe has exceeded the dew point, and therefore the sensor element of the gas sensor gets moistened by such condensed water. Meanwhile, there are cases where, after the internal combustion engine has been restarted, the temperature of the inner face of the exhaust pipe is lower than the temperature of the inner face of each exhaust port. In this case, condensed water is produced on the inner face of the exhaust pipe and the sensor element gets moistened by such condensed water.

Moreover, in connection with the above, the sentence "when moisture content is adhering on the inner face" may be interpreted as referring also to the cases where moisture content is adhering on at least one of the inner faces of the aforementioned exhaust passages. Further, the sentence "when moisture content is adhering" refers not only to the cases where adhesion of moisture content is actually detected, but also to the cases where it is estimated that moisture content is adhering and the cases where it is estimated that condensed water has been or is being produced. On the other hand, the sentence "when moisture content is adhering" is not intended to encompass all the cases where moisture content is adhering regardless of the amount of the adhering moisture content. That is, it excludes the cases where the amount of the adhering moisture content is too small to moisten the sensor element. The state where the amount of the adhering moisture content is too small to moisten the sensor element can be detected based on the temperature of the inner face of the exhaust passage. That is, if the temperature of the inner face of the exhaust passage is equal to or lower than a predetermined temperature, it can be determined that the amount of the adhering moisture content is too small to moisten the gas sensor. Alternatively, the state where the amount of the adhering moisture content is too small to moisten the gas sensor may be detected using various other methods.

Considering the fact that there exist gas sensors capable of producing current outputs and voltage outputs independently, the application of the gas sensor controller described above is not limited to limit-current type gas sensors.

Further, the gas sensor controlled by the above-described gas sensor controller may be a limit-current type gas sensor and the gas sensor controller may further include an output control portion that controls the gas sensor to selectively produce current outputs or voltage outputs. In this case, the output control portion may be adapted to control the gas sensor to produce voltage outputs at least when the energization limitation portion is energizing the heater while limiting the amount of power supplied to the heater.

That is, in the case where the gas sensor is a limit-current type gas sensor, the gas sensor controller may be provided with the above-described output control portion that controls, in order to obtain voltage outputs from the gas sensor, the gas sensor to produce voltage outputs as described above.

Further, the above-described gas sensor controller may be such that: the output control portion controls the gas sensor to produce voltage outputs when the energization limitation portion is energizing the heater while limiting the amount of power supplied to the heater; and the output control portion controls the gas sensor to produce current outputs when the energization limitation portion is energizing the heater without limiting the amount of power supplied to the heater.

Further, the above-described gas sensor controller may be such that: the specific output obtaining portion obtains voltage outputs from the gas sensor when the energization limitation portion is energizing the heater while limiting the amount of power supplied to the heater; and the specific output obtaining portion obtains current outputs from the gas sensor when the energization limitation portion is energizing the heater without limiting the amount of power supplied to the heater.

Further, the above-described gas sensor controller may be such that: when the gas sensor is producing voltage outputs under the control of the output control portion, an air-fuel ratio control is executed using the voltage outputs; and when the gas sensor is producing current outputs under the control of the output control portion, the air-fuel ratio control is executed using the current outputs.

Further, the above-described gas sensor controller may be such that: when no moisture content is adhering on the inner face of the exhaust passage in the exhaust system, the energization limitation portion energizes the heater while controlling the amount of power supplied to the heater such that the temperature of a sensor element of the gas sensor is 700° C. or higher; and when moisture content is adhering on the inner face of the exhaust passage in the exhaust system, the energization limitation portion energizes the heater while limiting the amount of power supplied to the heater such that the temperature of the sensor element of the gas sensor is approximately 300 to 400° C.

As such, the invention provides a gas sensor controller that enables early reduction of exhaust emissions by realizing early execution of the air-fuel ratio control while preventing cracking of the sensor element of a gas sensor due to moistening.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein:

FIG. 4 is a view conceptually illustrating the correlation between the voltage outputs of the A/F sensor 23 and the temperature of the sensor element 23a and the correlation between the current outputs of the A/F sensor 23 and the temperature of the sensor element 23a.

DETAILED DESCRIPTION OF THE EMBODIMENTS

Example embodiments of the invention will be described in detail with reference to the drawings.

Figure 1:
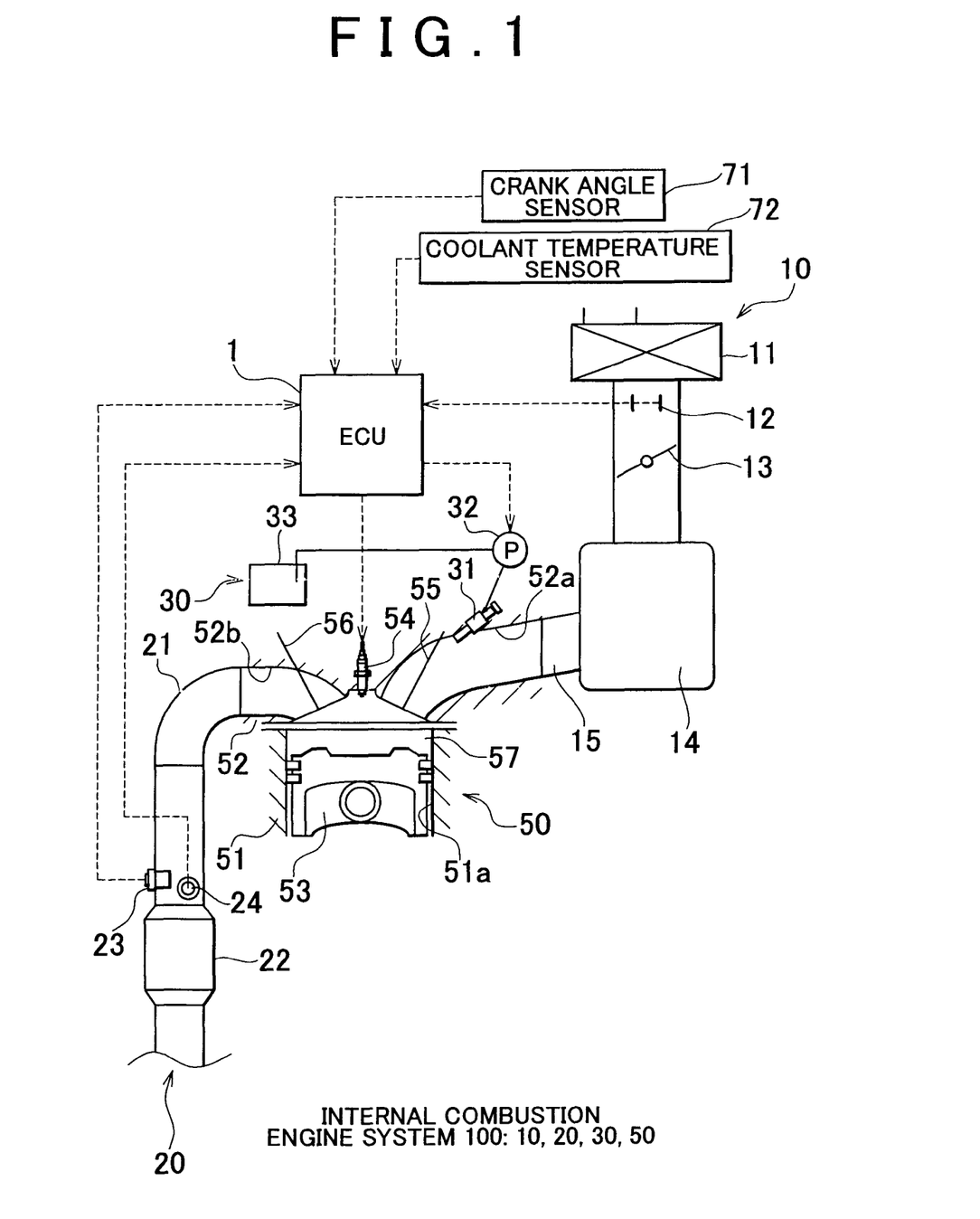
FIG. 1 is a view schematically showing an ECU 1 together with an internal combustion engine system 100.

FIG. 1 schematically shows an internal combustion engine system 100 and an ECU (Electronic Control Unit) 1 that serves as a gas sensor controller according to an example embodiment of the invention. The internal combustion engine system 100 is constituted of an intake system 10, an exhaust system 20, a fuel injection system 30, and an internal combustion engine 50. The intake system 10 is a structure for introducing air into the internal combustion engine 50. The intake system 10 is constituted of an air-cleaner 11 for filtering intake air, an airflow meter 12 for measuring an intake air amount GA, a throttle valve 13 for adjusting the flowrate of intake air, a surge tank 14 for temporarily storing intake air, an intake manifold 15 for distributing intake air to the respective cylinders of the internal combustion engine 50, and intake pipes provided between these components.

The exhaust system 20 is constituted of an exhaust manifold 21, a three-way catalyst 22, a silencer (not shown in the drawings), and exhaust pipes provided between these components. The exhaust manifold 21 is a component via which the exhaust gases from the respective cylinders converge. The three-way catalyst 22 is a component for purifying exhaust gas. The three-way catalyst 22 oxidizes hydrocarbon (HC) and carbon monoxide (CO) and removes nitrogen oxide ($NO_x$) by reducing them. In the exhaust system 20, a limit-current type A/F sensor (air-fuel ratio sensor) 23 that measures the air-fuel ratio based on the concentration of oxygen (concentration of detection target substance) in exhaust gas is provided upstream of the three-way catalyst 22. Further, in the exhaust system 20, an exhaust gas temperature sensor 24 that detects the temperature of exhaust gas is provided at substantially the same position as the A/F sensor 23 the with respect to the flow direction of exhaust gas.

The fuel injection system 30 is a structure for supplying and injecting fuel. The fuel injection system 30 is constituted of fuel injection valves 31, a fuel pump 32, a fuel tank 33, and so on. The injection valves 31 are components for injection fuel. Each fuel injection valve 31 is opened, under the control of the ECU 1, at a given injection time to inject fuel. The ECU 1 controls the amount of fuel injected from each injection valve 31 by adjusting the duration for which the fuel injection valve 31 is opened, that is, the time period from when the fuel injection valve 31 is opened to when it is closed. The fuel pump 32 is a component for generating a given injection pressure by pressurizing fuel. That is, the fuel pump 32 adjusts, under the control of the ECU 1, the injection pressure to a given level.

The internal combustion engine 50 is constituted of a cylinder block 51, a cylinder head 52, pistons 53, spark plugs 54, intake valves 55, and exhaust valves 56. The internal combustion engine 50 is an in-line four-cylinder gasoline engine. However, it is to be noted that the internal combustion engine 50 is not necessarily limited to any specific engine as long as the invention can be applied. For example, the internal combustion engine 50 may be an internal combustion engine having a different cylinder layout and/or a different number of cylinders. Further, the internal combustion engine 50 may be a diesel engine or an engine running on alternative fuel. Further, although FIG. 1 only shows a cylinder 51a as a representative of the cylinders of the internal combustion engine 50, it is to be noted that other cylinders have the same structure as that shown in FIG. 1. The cylinders are formed in a generally cylindrical shape in the cylinder block 51. The pistons 53 are disposed in the respective cylinders. The cylinder head 52 is mounted on the cylinder block 51. Combustion chambers 57 are defined by being surrounded by the cylinder block 51, the cylinder head 52, and the respective pistons 53.

Intake ports 52a for delivering intake air to the combustion chambers 57 and exhaust ports 52b for discharging combusted gas from the combustion chambers 57 are formed in the cylinder head 52. Further, the intake valves 55 that open and close the respective intake ports 52a and exhaust valves 56 that open and close the respective exhaust ports 52b are provided in the cylinder head 52. Further, a variable valve timing mechanism (not shown in the drawings) is provided in the cylinder head 52. The spark plugs 54 are mounted in the cylinder head 52 such that the electrode of each spark plug 54 sticks out toward substantially the center of the upper area of the corresponding combustion chamber 57. As well as these components, the internal combustion engine 50 is provided with various sensors including a crank angle sensor 71 that generates pulses proportional to the engine speed NE and a coolant temperature sensor 72 that detects the temperature of the coolant of the internal combustion engine 50.

The ECU 1 is a component that is mainly used to control the internal combustion engine 50. In this example embodiment, the ECU 1 is adapted to control also a heater of the A/F sensor 23, etc. As well as the heater of the A/F sensor 23, various control objects including the variable timing mechanism are connected to the ECU 1 via corresponding drive circuits (not shown in the drawings). Further, various sensors including the airflow meter 12, the exhaust gas temperature sensor 24, the crank angle sensor 71, and the coolant temperature sensor 72 are connected to the ECU 1.

Figure 2:
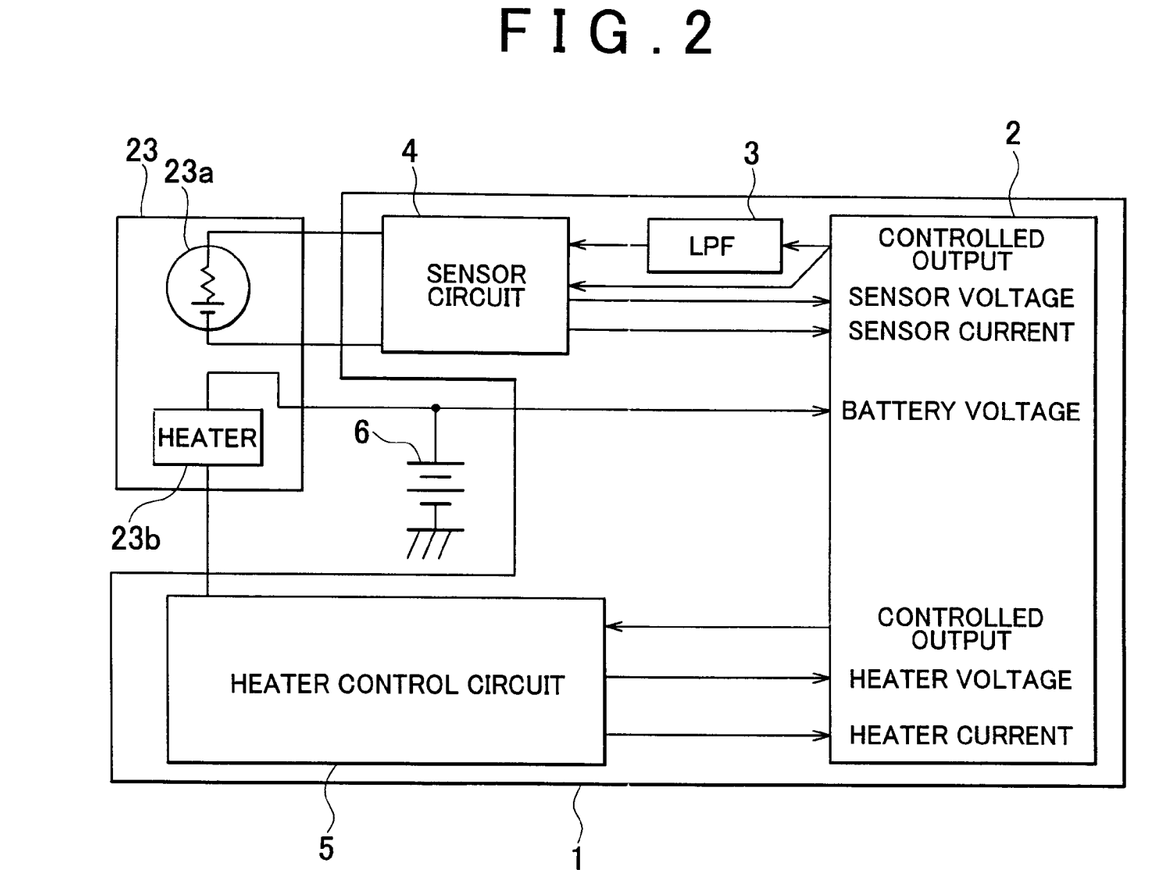
FIG. 2 is a view schematically showing an A/F sensor 23 together with the ECU 1.

Next, the method for obtaining the outputs of the A/F sensor 23 and the method for controlling the heater of the A/F sensor 23 will be described in detail. FIG. 2 schematically shows the structure of the A/F sensor 23 and the structure of the ECU 1. The A/F sensor 23 is constituted of a sensor element 23a made of zirconium oxide ($ZrO_2$) and a heater 23b. The ECU 1 is constituted of: a microcomputer 2 having a CPU (Central Processing Unit), a ROM (Read Only Memory), a RAM (Random Access Memory), and other components; a low-pass filter (will be simply referred to as "LPF") 3; a sensor circuit 4; a heater control circuit 5; A/D converters (not shown in the drawings); D/A converters (not shown in the drawings), and so on.

When obtaining current outputs from the A/F sensor 23, the microcomputer 2 issues signals for applying voltage to the sensor element 23a. These signals are converted into rectangular-wave analogue voltage at the corresponding D/A converter. Then, the high-frequency components of the obtained analogue voltage is removed at the LPF 3, after which the analogue voltage is input to the sensor circuit 4. Then, the sensor circuit 4 applies voltage to the sensor element 23a based on the analogue voltage input to the sensor circuit 4. While voltage is being thus applied to the sensor element 23a, the microcomputer 2 detects, via the sensor circuit 4 and the corresponding A/D converter, the current at the A/F sensor 23 which changes in accordance with the oxygen concentration in exhaust gas.

Figure 3:
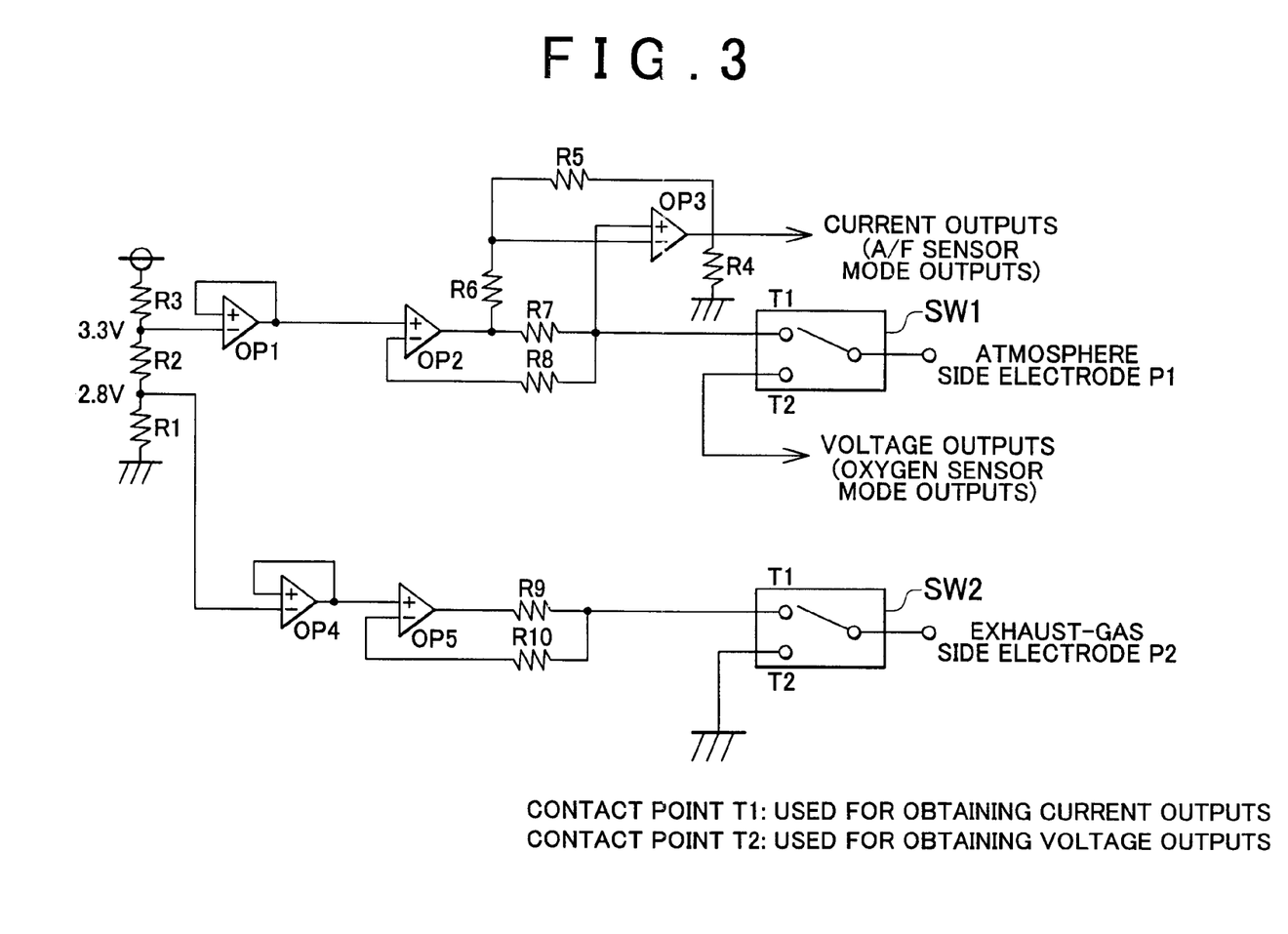
FIG. 3 is a view schematically showing the circuit configuration of a sensor circuit 4.

FIG. 3 schematically shows the circuit configuration of the sensor circuit 4. Referring to FIG. 3, the sensor circuit 4 includes operational amplifiers OP1 to OP5, resistors R1 to R10, and first and second switches SW1, SW2. The first switch SW1 is connected to an atmosphere side electrode P1 of the A/F sensor 23, which is made of platinum (Pt). The second switch SW2 is connected to an exhaust side electrode P2 of the A/F sensor 23, which is also made of platinum. A contact point T1 of the first switch SW1 and a contact point T1 of the second switch SW2 are connected to each other via the resistor R2. A contact point T2 of the first switch SW1 is connected via the corresponding A/D converter to the microcomputer 2, and a contact point T2 of the second switch SW2 is grounded. The first switch SW1 and the second switch SW2 are both connected to the microcomputer 2, and their switching are controlled by the microcomputer 2.

When the aforementioned signals for applying voltage to the sensor element 23a of the A/F sensor 23 are issued in order to obtain current outputs of the A/F sensor 23, the voltage at the resistor R2 becomes, for example, 0.4 V as shown in FIG. 3. Further, when obtaining current outputs of the A/F sensor 23, the microcomputer 2 controls the first switch SW1 and the second switch SW2 to be switched to the contact points T1, respectively, whereby the sensor element 23a is energized with voltage corresponding to the voltage at the resistor R2. During this time, the current at the resistor R7 is detected via the operational amplifier OP3 and the corresponding A/D converter. This is how the A/F sensor serves as an air-fuel ratio sensor and produce current outputs.

On the other hand, when obtaining voltage outputs of the A/F sensor 23, the microcomputer 2 controls the first switch SW1 and the second switch SW2 to be switched to the contact points T2, respectively. In this state, oxygen ions move between the atmosphere side electrode P1 and the exhaust side electrode P2 in accordance with the difference between the concentration of oxygen around the electrode P1 and the concentration of oxygen around the electrode P2, whereby electromotive force corresponding to the amount of oxygen ions occurs between the electrodes P1, P2. Because the amount of oxygen ions that move between the electrodes P1, P2 per unit time changes in accordance with the difference between the oxygen concentration in the atmosphere and that in the exhaust gas, voltage outputs corresponding to the oxygen concentration in the exhaust gas can be derived form the electromotive force. That is, voltage outputs of the A/F sensor 23 can be obtained by detecting the aforementioned electromotive force via the contact point T2 of the first switch SW1 and the corresponding A/D converter. This is how the A/F sensor 23 serves as an oxygen sensor and produce voltage outputs. Note that when obtaining voltage outputs of the A/F sensor 23, the second switch SW2 is not necessarily switched to the contact point T2.

Figure 4:
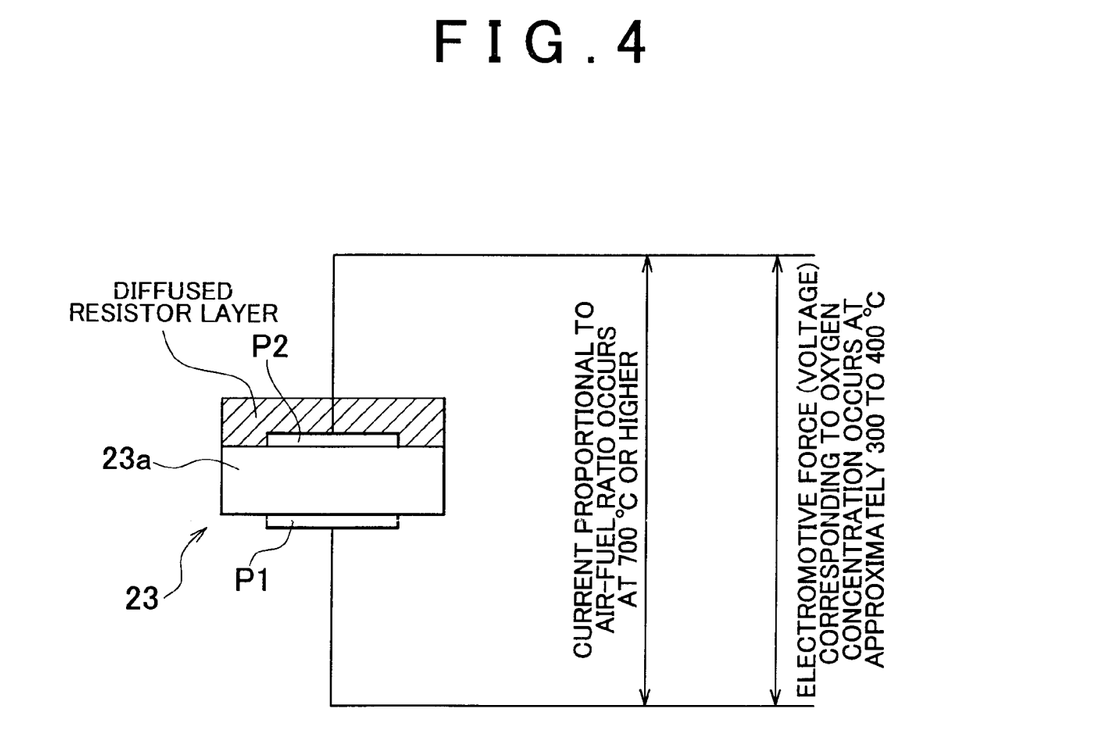

FIG. 4 conceptually illustrates the correlation between the voltage outputs of the A/F sensor 23 and the temperature of the sensor element 23a and the correlation between the current outputs of the A/F sensor 23 and the temperature of the sensor element 23a. The voltage outputs and the current outputs of the A/F sensor 23 are correlative with the temperature of the sensor element 23a. Therefore, when using the voltage outputs and the current outputs of the A/F sensor 23 in the air-fuel ratio control, it is necessary to obtain these outputs when the temperature of the sensor element 23a is appropriate. Referring to FIG. 4, the A/F sensor 23 produces current outputs suitable for the use in the air-fuel ratio control, that is, current outputs proportional to the air-fuel ratio in exhaust gas, when the temperature of the sensor element 23a is, for example, 700° C. or higher. On the other hand, the A/F sensor 23 produces voltage outputs suitable for the use in the air-fuel ratio control, that is, voltage outputs corresponding to the concentration of oxygen in exhaust gas, when the temperature of the sensor element 23a is, for example, approximately 300 to 400° C.

Back to FIG. 2, in order to control the heater 23b of the A/F sensor 23, the heater control circuit 5 controls the energization of the heater 23b under the control of the microcomputer 2. When the microcomputer 2 activates the heater control circuit 5 to energize the heater 23b, power starts to be supplied from a battery 6 to the heater 23b. At this time, the heater control circuit 5 performs, under the control of the microcomputer 2, duty control on the energization of the heater 23b. While the heater 23b is thus energized, the microcomputer 2 detects the current and the voltage at the heater 23b via the heater control circuit 5 and the corresponding A/D converter and calculates the admittance of the heater 23b. The admittance of the heater 23b is correlative with the temperature of the sensor element 23a. Therefore, for example, when performing the duty control on the energization of the heater 23b so as to maintain the temperature of the sensor element 23a at a target temperature, feedback control is executed using the calculated admittance of the heater 23b. For example, the feedback control is executed so as to maintain the admittance of the heater 23b at a level corresponding to the target temperature of the sensor element 23a.

The ROM of the microcomputer 2 is a component for storing various programs, various data maps, and so on, which are used by the CPU. More specifically, the ROM of the microcomputer 2 stores programs for controlling the internal combustion engine 50, a program for obtaining the outputs of the A/F sensor 23 (will hereinafter be referred to as "output obtaining program") and a program for controlling the heater 23b (will hereinafter be referred to as "heater control program"). As well as these programs, the ROM of the microcomputer 2 stores a program for controlling the A/F sensor 23 to selectively produce current outputs or voltage outputs (will hereinafter be referred to as "output control program"), a program for detecting an inner face surface temperature Tp representing the temperature of the inner face of the exhaust port 52b and an inner face temperature Tq representing the temperature of the inner face of an exhaust passage near the A/F sensor 23 (will hereinafter be referred to as "inner face temperature detection program"), and a program for detecting whether moisture content is adhering on the inner face of the exhaust port 52b or the exhaust passage inner face near the A/F sensor 23 (will hereinafter be referred to as "moisture adhesion detection program"). Here, note that these programs may be incorporated in the programs for controlling the internal combustion engine 50.

The programs for controlling the internal combustion engine 50 include an air-fuel ratio control program on which the fuel injection amount is controlled so as to control the air-fuel ratio as needed. More specifically, the air-fuel ratio control program includes a first air-fuel ratio control program that is executable with voltage outputs of the A/F sensor 23 and a second air-fuel ratio control program that is executable with current outputs of the A/F sensor 23.

The inner face temperature detection program is adapted to obtain the inner face temperature Tp by estimating its value based on a given data map for the inner face temperature Tp, which was prepared in advance, and various parameters. According to the inner face temperature detection program, more specifically, when obtaining the inner face temperature Tp, related parameters including the intake air amount GA, the fuel injection amount, the ignition timing, the valve timing, and the coolant temperature are read and then applied to the data map for the inner face temperature Tp, and then the value obtained from the data map is then corrected as needed, whereby the inner face temperature Tp is obtained. In this procedure for obtaining the inner face temperature Tp, a heat-transfer coefficient of the heat applied from the exhaust gas to the inner face of each exhaust port 52b is also be used. Note that the inner face temperature Tp may instead be obtained in various other methods. For example, a temperature sensor may be used to detect the inner face temperature Tp. In this case, the inner face temperature detection program is adapted to determine the inner face temperature Tp based on the output of the temperature sensor.

Further, the inner face temperature detection program is adapted to obtain the inner face temperature Tq as follows. When obtaining the inner face temperature Tq, an exhaust gas temperature $T_{EA1}$ representing the temperature of exhaust gas around the A/F sensor 23 is read from a data map that defines the value of the exhaust gas temperature $T_{EA1}$ with respect to the engine speed NE and the intake air amount GA. This data map was empirically obtained from, for example, an engine bench test. According to this data map, the higher the engine speed NE and the larger the intake air amount GA, the higher the exhaust gas temperature $T_{EA1}$ is determined to be.

Then, the inner face temperature Tq is calculated by applying the exhaust gas temperature $T_{EA1}$ obtained as described above and an outside temperature $T_{OA}$ detected based on the output of an intake air temperature sensor (not shown in the drawings) to the following expression:

$$Tq = \alpha(T_{EA1} - T_{OA})$$

where α is a constant. Note that the exhaust gas temperature $T_{EA1}$ may alternatively be detected based on the output of the exhaust gas temperature sensor 24. Also, note that the inner face temperature detection program may be adapted to obtain the inner face temperature Tq using various methods other than described above.

The moisture adhesion detection program is adapted to determine that moisture content is adhering on the inner face of the exhaust port 52b if the inner face temperature Tp, which has been obtained as described above, is equal to or lower than a predetermined temperature (e.g., 54° C. as a dew point). Further, the moisture adhesion detection program is adapted to determine that moisture content is adhering on the exhaust passage inner face near the A/F sensor 23 if the inner face temperature Tq, which has been obtained as described above, is equal to or lower than the predetermined temperature. That is, in the moisture adhesion detection program of the example embodiment, adhesion of moisture content is detected if at least one of the inner face temperature Tp and the inner face temperature Tq is equal to or lower than the predetermined temperature.

The heater control program is formulated as an energization limitation program. That is, when adhesion of moisture content has been detected by the moisture adhesion detection program, the energization limitation program energizes the heater 23b while limiting the amount of power supplied thereto. This energization limitation is performed so as to limit the amount of power supplied to the heater 23b to a level at and below which the temperature of the sensor element 23a is suppressed to a predetermined temperature (e.g., approximately 300 to 400° C.). Further, in the heater control program, when adhesion of moisture content has not been detected by the moisture adhesion detection program, the energization limitation is loosened or cancelled such that the temperature of the sensor element 23a increases up to a predetermined temperature (e.g., 700° C.). After the temperature of the sensor element 23a reaches the predetermined temperature, the duty control on the energization of the heater 23b is performed such that the temperature of the sensor element 23a is maintained at the predetermined temperature.

The output control program includes a first specific output control program and a second specific output control program. The first specific output control program is adapted to make the A/F sensor 23 produce voltage outputs at least when the amount of power supplied to the heater 23b is being limited by the energization limitation program. At this time, to make the A/F sensor 23 produce voltage outputs, the first specific output control program switches the first switch SW1 and the second switch SW2 to the contact points T2, respectively, without applying voltage to the sensor element 23a. In this example embodiment, the output state of the A/F sensor 23 established through the control by the first specific output control program is maintained until the start of the output control by the second specific output control program.

The second specific output control program is adapted to make the A/F sensor 23 produce current outputs when the temperature of the sensor element 23a is at a predetermined temperature (e.g., 700° C.) at which the A/F sensor 23 can produce current outputs suitable for the use in the air-fuel ratio control. Whether the temperature of the sensor element 23a has reached the predetermined temperature can be determined by calculating the admittance of the heater 23b and determining whether the calculated admittance is equal to or larger than a value corresponding to the predetermined temperature. In this example embodiment, when making the A/F sensor produce current outputs, the second specific output control program switches the first switch SW1 and the second switch SW2 to the contact points T1, respectively, and applies voltage to the sensor element 23a.

Next, the output obtaining program includes a first specific output obtaining program and a second specific output obtaining program. In this example embodiment, the output obtaining program is provided as part of the air-fuel ratio control program. More specifically, the first specific output obtaining program is provided as part of the first air-fuel ratio control program, and the second specific output obtaining program is provided as part of the second air-fuel ratio control program.

The first specific output obtaining program is adapted to obtain the voltage outputs from the A/F sensor 23 at least when the amount of power supplied to the heater 23b is being limited by the energization limitation program. In this example embodiment, more specifically, the first specific output obtaining program is adapted to detect the outputs of the A/F sensor 23 when the A/F sensor 23 is producing voltage outputs under the output control by the first specific output control program. This is how voltage outputs of the A/F sensor 23 are obtained.

The second specific output obtaining program is adapted to obtain current outputs of the A/F sensor 23 when the temperature of the sensor element 23a is at a predetermined temperature (e.g., 700° C.) at which the A/F sensor 23 produces current outputs suitable for the use in the air-fuel ratio control. In the second example embodiment, more specifically, the second specific output obtaining program is adapted to obtain the outputs of the A/F sensor 23 when the A/F sensor 23 is producing current outputs under the output control by the second specific output control program. This is how current outputs of the A/F sensor 23 are obtained.

In this example embodiment, the microcomputer 2 and the foregoing programs may be regarded as corresponding to "controlling means", "limiting means", "determining means", "obtaining means", and so on. Particularly, the microcomputer 2 and the first specific output control program and the second specific output control program together serve as "specific output obtaining means", and the microcomputer 2 and the first specific output control program and the second specific output control program together serve as "output controlling means".

Figure 5:
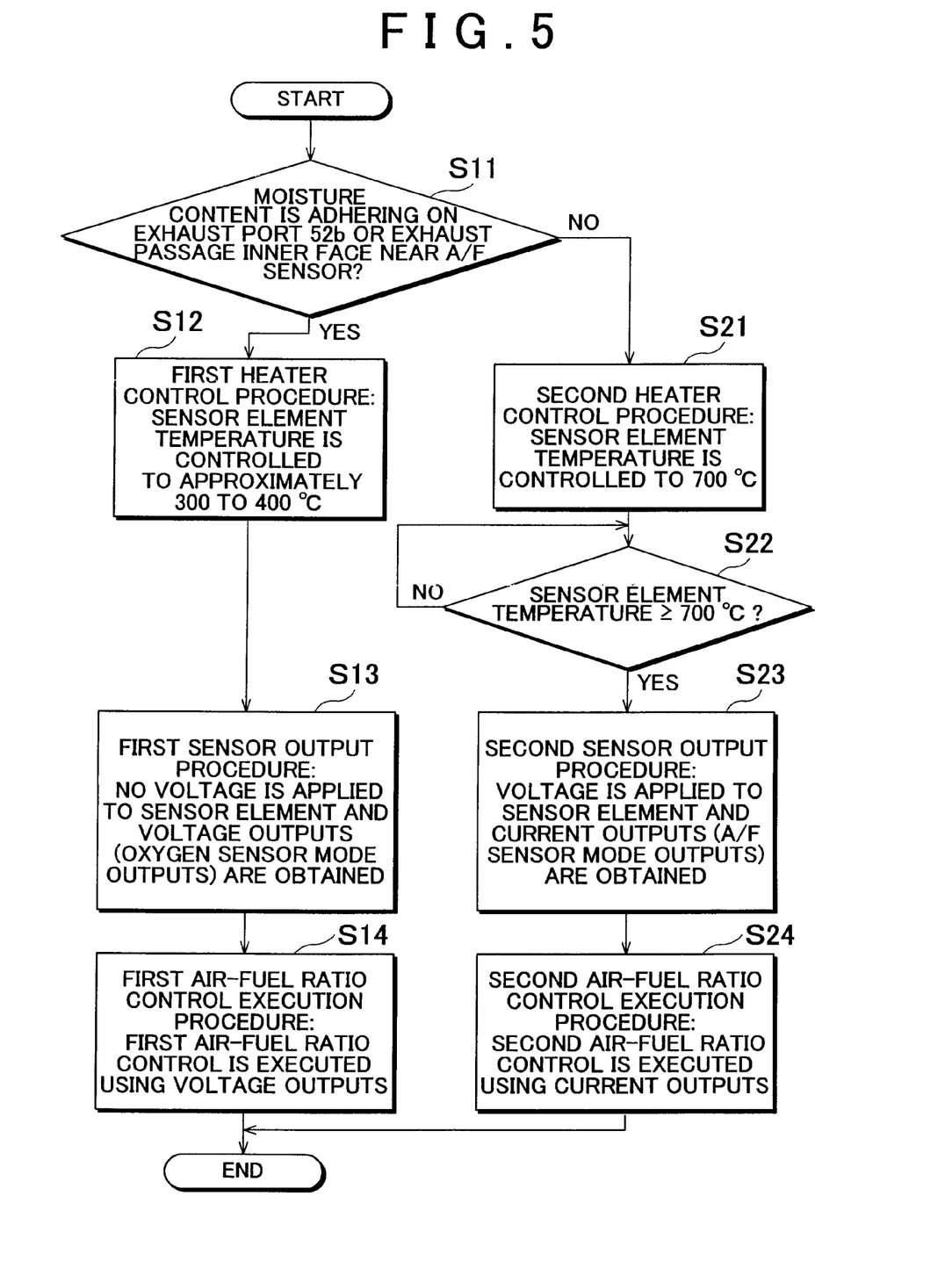
FIG. 5 is a flowchart illustrating a control routine executed by the ECU 1.

Next, the control routine executed by the ECU 1 will be described in detail with reference to FIG. 5. The CPU of the ECU 1 executes the routine illustrated by the flowchart of FIG. 5 on the above-described programs stored in the ROM. Through such program execution by the CPU, the ECU 1 realizes the control of the heater 23b, the control of the outputs of the A/F sensor 23, the obtaining of the outputs of the A/F sensor 23, and the execution of the air-fuel ratio control. The routine illustrated by the flowchart of the FIG. 5 is started at the start of the internal combustion engine 50, for example.

After the start of the routine, the CPU first determines whether moisture content is adhering on the inner face of the exhaust port 52b or the exhaust passage inner face near the A/F sensor 23 (step 11). More specifically, at this time, the CPU obtains the inner face temperature Tp and the inner face temperature Tq and then determines whether at least one of them is equal to or lower than a predetermined temperature (e.g., 54° C. as a dew point). If so, the CPU executes a first heater control procedure (step 12). In this procedure, the CPU executes processes for energizing the heater 23b while limiting the amount of power supplied thereto to an amount with which the temperature of the sensor element 23a is suppressed to a predetermined temperature (e.g., approximately 300 to 400° C.).

Then, the CPU executes a first sensor output procedure (step 13). In this procedure, the CPU executes processes for switching the first switch SW1 and the second switch SW2 to the contact points T2, respectively, without applying voltage to the sensor element 23a. Then, the CPU executes a first air-fuel ratio control execution procedure (step 14). In this procedure, the CPU executes processes for executing the first air-fuel ratio control that is executable with voltage outputs of the A/F sensor 23, and then the CPU obtains voltage outputs from the A/F sensor 23. As such, the air-fuel ratio control can be executed at an early stage while preventing cracking of the sensor element 23a due to moistening, and therefore exhaust emissions can be reduced promptly.

On the other hand, if "NO" is obtained in step 11, the CPU then executes a second heater control procedure (step 21). In this procedure, the CPU executes processes for energizing the heater 23b while loosening or canceling the limitation on the amount of power supplied to the heater 23b such that the temperature of the sensor element 23a increases up to a predetermined temperature (e.g., 700° C.). After the temperature of the sensor element 23a has reached the predetermined temperature, the CPU executes processes for executing the duty control on the energization of the heater 23b such that the temperature of the sensor element 23a remains equal to the predetermined temperature. Subsequently, the CPU determines whether the temperature of the sensor element 23a is equal to or higher than the predetermined temperature (step 22). If "NO", the CPU repeats step 22 until "YES" is obtained.

If "YES" is obtained in step 22, on the other hand, the CPU executes a second sensor output procedure (step 23). In this procedure, the CPU executes processes for switching the first switch SW1 and the second switch SW2 to the contact points T1, respectively, and processes for applying voltage to the sensor element 23a. Then, the CPU executes a second air-fuel ratio execution procedure (step 24). In this procedure, the CPU executes the second air-fuel ratio control that is executable with current outputs of the A/F sensor 23, and then the CPU obtains current outputs from the A/F sensor 23. As such, the effect of reducing exhaust emissions continues. Accordingly, the air-fuel ratio control can be executed at an early stage while preventing cracking of the sensor element 23a due to moistening, and therefore exhaust emissions can be reduced promptly.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

What is claimed is:

1. A gas sensor controller for controlling a gas sensor that is provided in an exhaust system of an internal combustion engine and produces current outputs corresponding to a concentration of a detection target substance in exhaust gas by being supplied with voltage and produces voltage outputs corresponding to the concentration of a detection target substance in exhaust gas according to a difference between the concentration of the detection target substance around a first electrode of a pair of electrodes of the gas sensor and the concentration of the detection target substance around a second electrode of the pair of electrodes of the gas sensor, the gas sensor controller comprising:

an energization limitation portion that, energizes a heater of the gas sensor while limiting an amount of power supplied to the heater when moisture content is adhering on an inner face of an exhaust passage in the exhaust system and that energizes the heater of the gas sensor without limiting the amount of power supplied to the heater when no moisture content is adhering on the inner face of the exhaust passage in the exhaust system;

an output control portion that controls the gas sensor to selectively produce current outputs or voltage outputs; and a specific output obtaining portion that obtains voltage outputs from the gas sensor when the energization limitation portion is energizing the heater while limiting the amount of power supplied to the heater, and obtains current outputs from the gas sensor when the energization limitation portion is energizing the heater without limiting the amount of power supplied to the heater, wherein the output control portion controls the gas sensor to produce voltage outputs when the energization limitation portion is energizing the heater while limiting the amount of power supplied to the heater, and wherein the output control portion controls the gas sensor to produce current outputs when the energization limitation portion is energizing the heater without limiting the amount of power supplied to the heater.

2. The gas sensor controller according to claim 1, wherein: the gas sensor is a limit-current type gas sensor.

3. The gas sensor controller according to claim 1, wherein: when the gas sensor is producing voltage outputs under the control of the output control portion, an air-fuel ratio control is executed using the voltage outputs; and when the gas sensor is producing current outputs under the control of the output control portion, the air-fuel ratio control is executed using the current outputs.

4. The gas sensor controller according to claim 1, wherein: when no moisture content is adhering on the inner face of the exhaust passage in the exhaust system, the energization limitation portion energizes the heater while controlling the amount of power supplied to the heater such that the temperature of a sensor element of the gas sensor is 700° C. or higher; and when moisture content is adhering on the inner face of the exhaust passage in the exhaust system, the energization limitation portion energizes the heater while limiting the amount of power supplied to the heater such that the temperature of the sensor element of the gas sensor is approximately 300° to 400° C.

5. The gas sensor controller according to claim 1, wherein: the controller determines whether moisture content is adhering on the inner face of the exhaust passage in the exhaust system based on temperature of the inner face of the exhaust passage in the exhaust system.

6. The gas sensor controller according to claim 1, wherein: the specific output obtaining portion includes a first switch which is connected to the first electrode and a second switch connected to the second electrode, a first contact point of the first switch is connected to a first contact point of a second switch via a resistor, and the output control portion switches the first and second switches to the first contact points of the first and second switches, respectively, when the energization limitation portion is energizing the heater without limiting the amount of power supplied to the heater.

7. The gas sensor controller according to claim 6, wherein:
a second contact point of the first switch is connected to an A/D converter and a second contact point of the second switch is connected to ground, and the output control portion switches the first and second switches to the second contact points of the first and second switches, respectively, when the energization limitation portion is energizing the heater while limiting the amount of power supplied to the heater.

* * * * *